United States Patent
Chen et al.

(10) Patent No.: US 8,433,049 B2
(45) Date of Patent: Apr. 30, 2013

(54) COMMUNICATION DEVICE AND COMMUNICATION METHOD THEREOF

(75) Inventors: Yi-Chao Chen, Taipei Hsien (TW); Jin-Hau Kuo, Taipei Hsien (TW); Chung-Hsuan Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 509 days.

(21) Appl. No.: 12/650,794

(22) Filed: Dec. 31, 2009

(65) Prior Publication Data

US 2011/0069823 A1    Mar. 24, 2011

(30) Foreign Application Priority Data

Sep. 22, 2009   (CN) .......................... 2009 1 0307452

(51) Int. Cl.
*H04M 3/42* (2006.01)
*H04M 3/00* (2006.01)
*H04M 1/00* (2006.01)
*G06F 3/048* (2006.01)
*G06F 3/041* (2006.01)

(52) U.S. Cl.
USPC ............. 379/201.01; 379/355.01; 715/769; 455/566; 345/173

(58) Field of Classification Search .... 379/88.01–88.23, 379/142.09, 355.01; 455/566
See application file for complete search history.

(56) References Cited

U.S. PATENT DOCUMENTS

| | | | |
|---|---|---|---|
| 7,551,731 B2* | 6/2009 | Durga et al. | 379/142.09 |
| 7,983,718 B1* | 7/2011 | Roka | 455/566 |
| 2001/0040621 A1* | 11/2001 | Gerszberg et al. | 348/14.01 |
| 2004/0184596 A1* | 9/2004 | Choi | 379/355.01 |
| 2007/0121821 A1* | 5/2007 | Su | 379/88.13 |
| 2010/0027773 A1* | 2/2010 | Wallis et al. | 379/201.01 |
| 2010/0081475 A1* | 4/2010 | Chiang et al. | 455/564 |
| 2010/0262928 A1* | 10/2010 | Abbott | 715/769 |

FOREIGN PATENT DOCUMENTS

| | | |
|---|---|---|
| CN | 201207662 Y | 3/2009 |
| CN | 101471981 A | 7/2009 |
| TW | 484298 | 4/2002 |
| TW | 200926747 A | 6/2009 |

* cited by examiner

*Primary Examiner* — Mohammad Islam
(74) *Attorney, Agent, or Firm* — Altis Law Group, Inc.

(57) ABSTRACT

A communication device provides a face detection module and a face recognition module. The face detection module detects faces in a photo input by a user. The face recognition module searches the detected faces in a storage system of the communication device. If the detected faces do not exist in the storage system, the communication device prompts the user to edit communication information of the detected faces. If the user wants to dial a phone number, the communication device searches the storage system for the phone number of a selected face in a photo and dials the phone number. If a phone number is calling in, the communication device displays a photo corresponding to the phone number, and highlights a face corresponding to the phone number.

15 Claims, 5 Drawing Sheets

COMMUNICATION DEVICE AND COMMUNICATION METHOD THEREOF

RELATED APPLICATIONS

This application claims all benefits accruing under 35 U.S.C from Chinese Patent Application No. 200910307452.3, filed on Sep. 22, 2009 in the People's Republic of China. The disclosure of the above-mentioned patent application is hereby incorporated by reference in its entirety.

BACKGROUND

1. Technical Field

Embodiments of the present disclosure relate to communication, and more particularly to a communication device and communication method thereof.

2. Description of Related Art

At present, if a user wants to dial a phone number that they cannot recall from memory, the user needs to search through a contact list. If the user cannot remember the contact name then they are out of luck.

What is needed, therefore, is an improved communication device and communication method.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
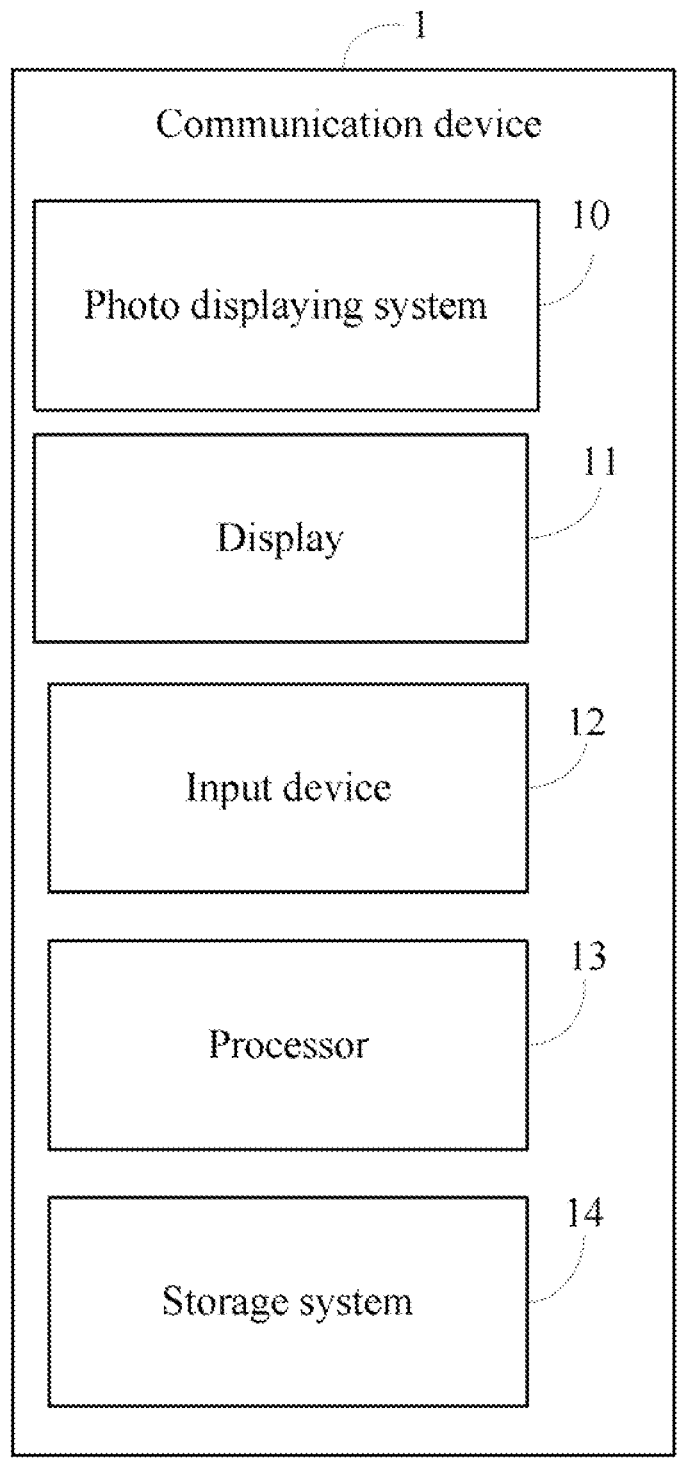
FIG. 1 is a block diagram of one embodiment of a communication device comprising a photo displaying system.

FIG. 1 is a block diagram of one embodiment of a communication device 1 comprising a photo displaying system 10. The photo displaying system 10 may be used to display photos associated with known incoming call numbers or numbers being dialed according to features in the photos. In one embodiment, the features may be, but not limited to, facial features in the photos. The communication device 1 includes a display 11 and an input device 12. In one embodiment, the display 11 may be a touch panel. In another embodiment, the display 11 may be electronically connected to the communication device 1. The input device 12 may be used to receive input actions of the user, for example, the user may select a photo corresponding to a phone number that the user wants to dial. In one embodiment, the input device 12 may be mechanical keys or a stylus corresponding to the touch panel. The communication device 1 may be a telephone.

The communication device 1 includes a processor 13 and a storage system 14. The processor 13 executes one or more computerized operations of the computer 1 and other applications, to provide the functions of the computer 1. The storage system 14 stores one or more programs, such as programs of an operating system, other applications of the communication device 1, and various kinds of data, such as function settings of the communication device 1, a short message application, or E-mails, for example. The storage system 14 stores a plurality of photos and features of the plurality of photos. In one embodiment, the storage system 14 may store facial features of recognized faces in the plurality of photos, each of the recognized faces corresponding to a photo number. In one embodiment, the facial features may include facial position, expression, locations of eyes, nose and mouth, etc. The storage system 14 also stores communication information corresponding to each face. In one embodiment, the communication information may include a phone number and a contact name stored in a contact list of the communication device 1, for example.

Figure 2:
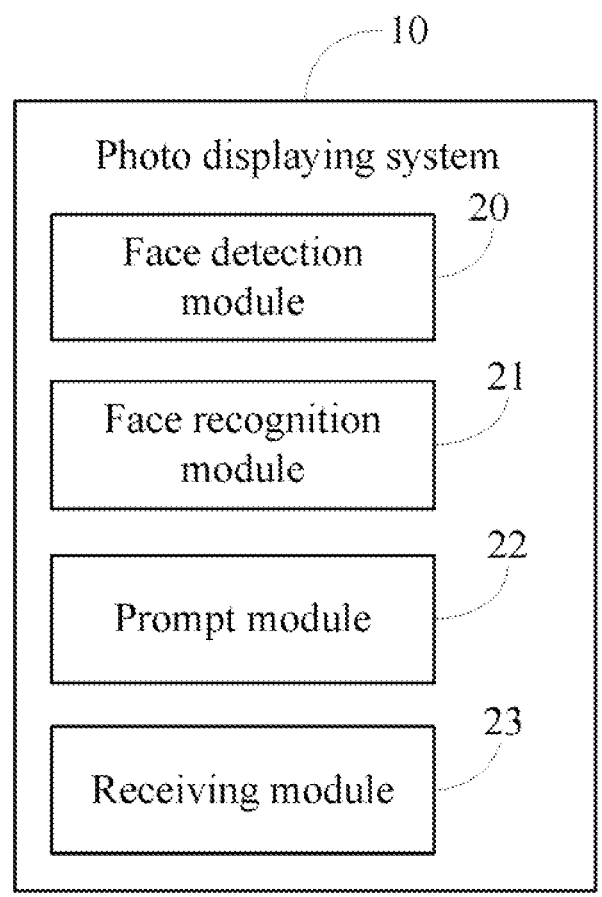
FIG. 2 is a block diagram of one embodiment of functional modules of the photo displaying system in FIG. 1.

FIG. 2 is a block diagram of functional modules of the photo displaying system 10 in FIG. 1. In one embodiment, the photo displaying system 10 may include a face detection module 20, a face recognition module 21, a prompt module 22, and a receiving module 23. It may be understood that the processor 13 may be used to execute one or more computerized codes of the functional modules 20-23. The one or more computerized codes of the functional modules 20-23 may be stored in the storage system 14.

The face detection module 20 detects faces in a photo input by the user.

The face recognition module 21 recognizes facial features of the detected faces, and then searches the storage system 14 for the detected faces. In one example, the facial features may include sizes of various facial components, such as eyes, nose, and mouth and distances between these facial components. As mentioned above, the storage system 14 stores facial features of a plurality of specified faces. The face recognition module 21 detects if the recognized facial features already exist in the storage system 14 by comparing the recognized facial features with the stored facial features.

If the detected faces do not exist in the storage system 14, the prompt module 22 prompts the user to edit communication information of the detected faces. In one embodiment, the prompt module 22 highlights the detected faces in the photo, such as enhancing brightness of the detected faces, for example.

The receiving module 23 stores the recognized facial features and edited communication information into the storage system 14.

If the user wants to dial a phone number, the receiving module 23 receives a photo selected from the storage system 14 or an external device, such as a camera module, for example. The face detection module 20 detects faces in the selected photo. The receiving module 23 displays the selected photo on the display 11. If the user selects a face in the selected photo, the receiving module 23 determines the selected face from the detected faces in response to receiving a selection signal.

The face recognition module 21 recognizes facial features of the selected face, and searches the storage system 14 for the selected face according to the recognized facial features of the selected face. The receiving module 23 searches the storage system 14 for a phone number corresponding to the selected face. In one embodiment, if the selected face corresponds to a plurality of phone numbers in the storage system 14, the user may select the phone number on the display 11 by using the input device 12.

When a call is received, the receiving module 23 determines a phone number of the call, and searches the storage system 14 for a photo and a face corresponding to the phone number. If the photo and the face corresponding to the phone number are found, the prompt module 22 displays the found photo on the display 11 and highlights the face corresponding to the phone number. If the call goes unanswered, then the prompt module 22 also displays the phone number as well as the highlighted photo on the display 11 until, for example, another call comes in or a user resets the display. If the photo and the face corresponding to the phone number are not found, the prompt module 22 displays the phone number on the display 11 and prompts that there is no photo corresponding to the phone number.

Figure 3:
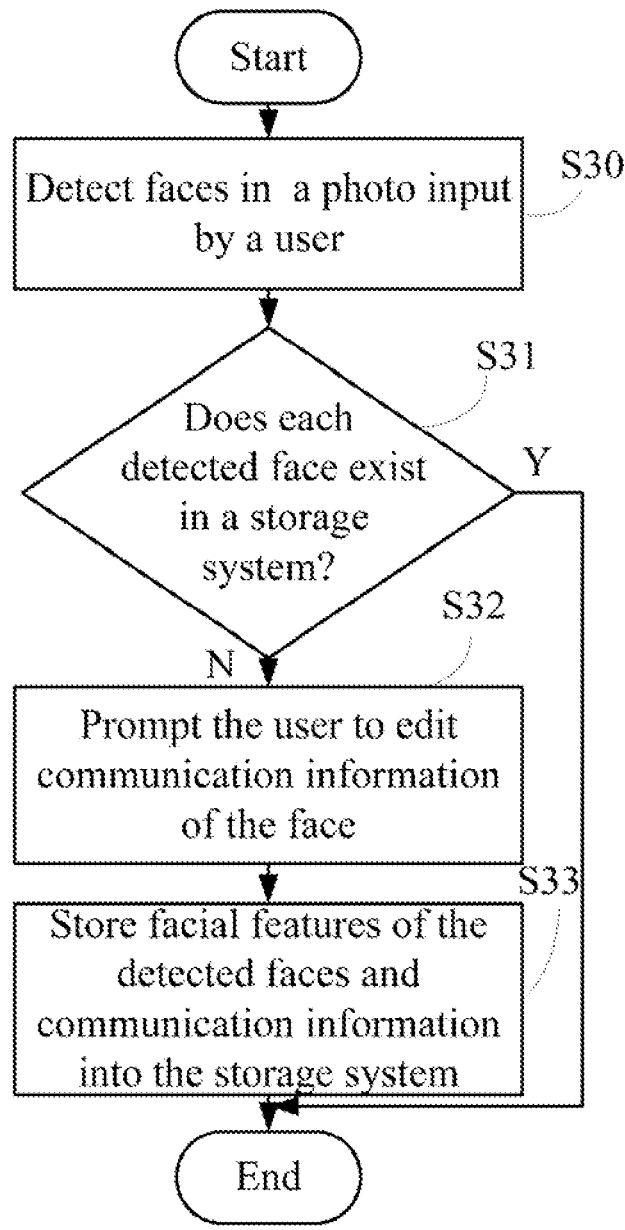
FIG. 3 is a flowchart of one embodiment of a method for storing communication information.

FIG. 3 is a flowchart of one embodiment of a method for storing communication information. Depending on the embodiment, additional blocks may be added, others removed, and the ordering of the blocks may be changed.

In block S30, the face detection module 20 detects faces in a photo input by the user.

In block S31, the face recognition module 21 recognizes facial features of the detected faces, and then searches the storage system 14 for the detected faces to detect if the detected faces exist in the storage system 14. If the detected faces exist in the storage system 14, the procedure ends. If there any detected faces do not exist in the storage system 14, block S32 is implemented.

In block S32, the prompt module 22 prompts the user to edit communication information of the detected faces that have not been searched in the storage system 14.

In block S33, the receiving module 22 stores the recognized facial features and edited communication information into the storage system 14.

Figure 4:
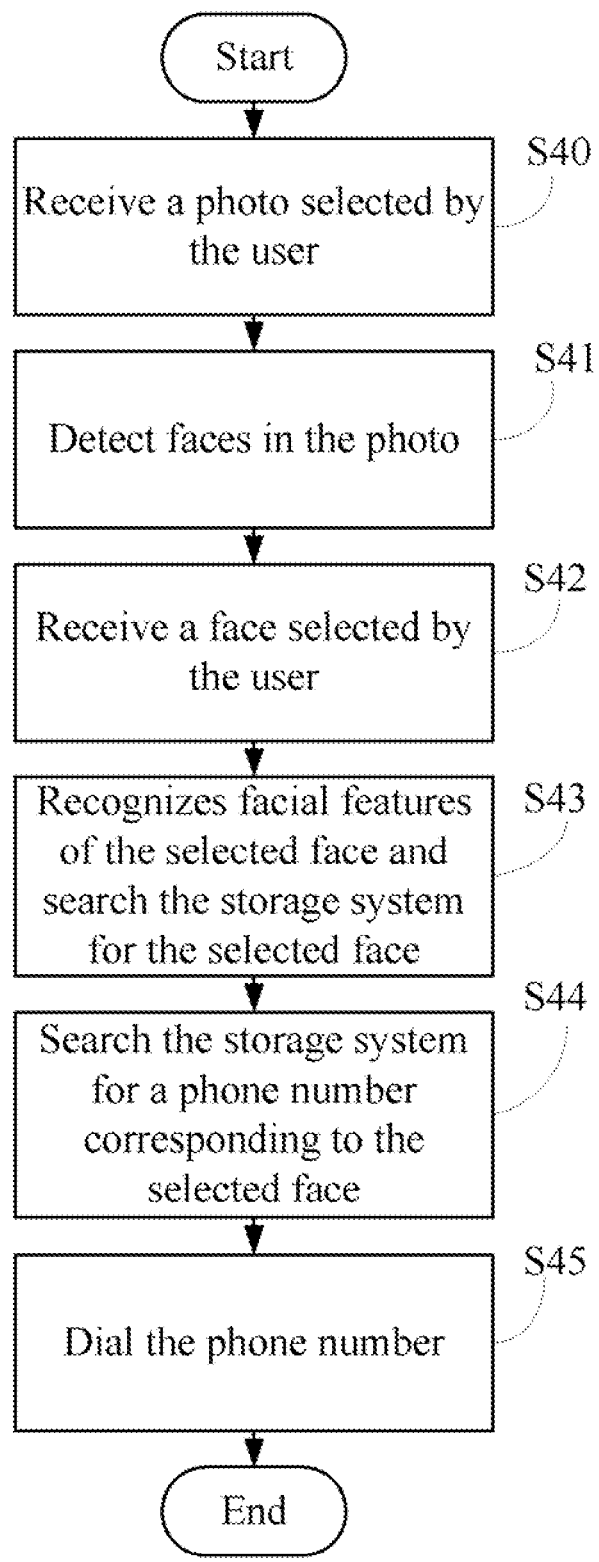
FIG. 4 is a flowchart of one embodiment of a method for dialing a phone number.

FIG. 4 is a flowchart of one embodiment of a method for dialing a phone number. Depending on the embodiment, additional blocks may be added, others removed, and the ordering of the blocks may be changed.

In block S40, the receiving module 23 receives a photo selected from the storage system 14 and displays the selected photo.

In block S41, the face detection module 20 detect faces in the selected photo.

In block S42, the receiving module 23 determines a selected face from the detected faces in response to receiving a selection signal.

In block S43, the face recognition module 21 recognizes facial features of the selected face, and searches the storage system 14 for the selected face according the recognized facial features of the selected face.

In block S44, the receiving module 23 searches the storage system 14 for a phone number corresponding to the selected face.

In block S45, the receiving module 23 dials the phone number.

Figure 5:
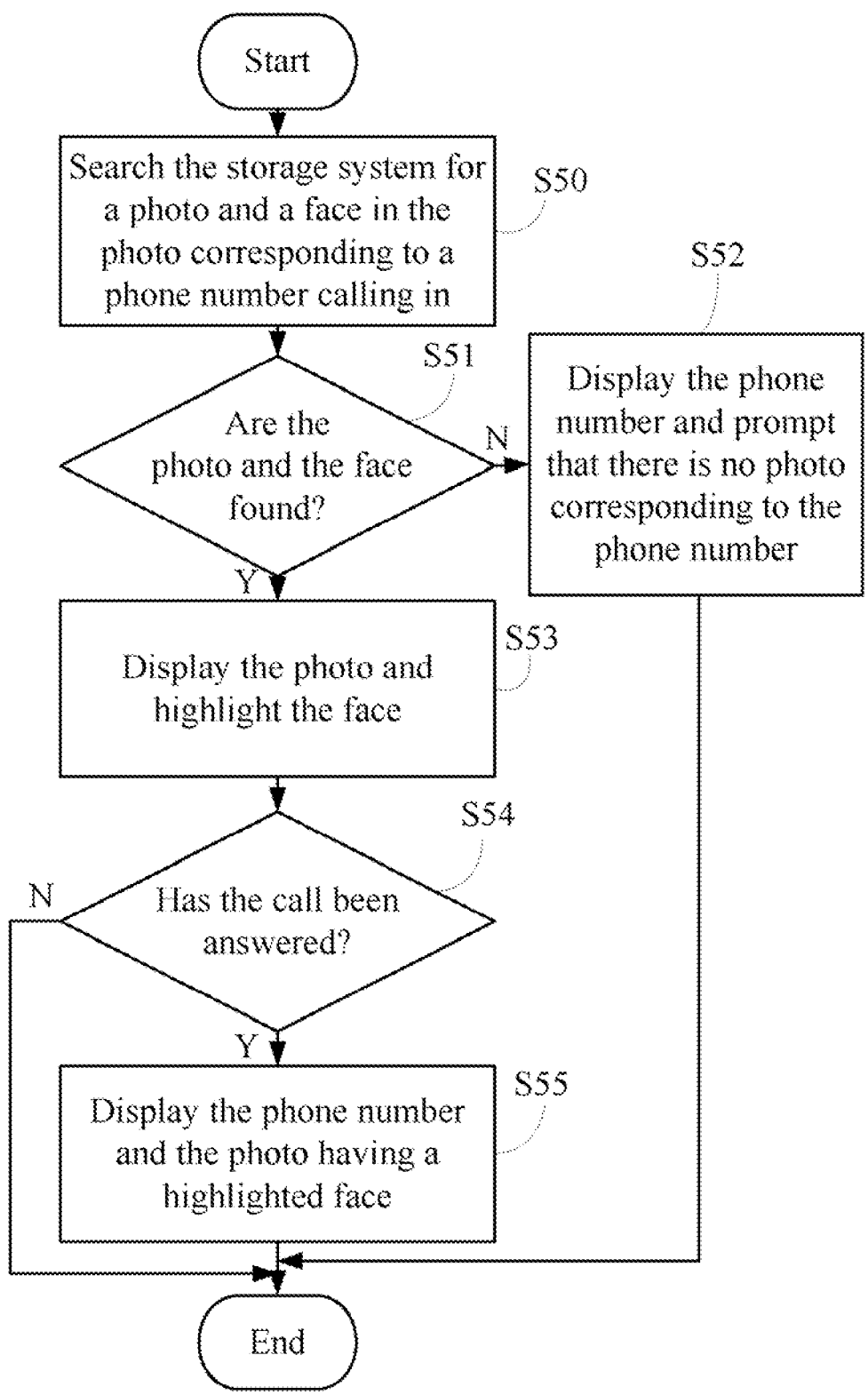
FIG. 5 is a flowchart of one embodiment of a method for receiving a call.

FIG. 5 is a flowchart of one embodiment of a method for receiving a call. Depending on the embodiment, additional blocks may be added, others removed, and the ordering of the blocks may be changed.

When a call is received, in block S50, the receiving module 23 determines a phone number of the call, and searches the storage system for a photo and a face in the photo corresponding to the phone number.

In block S51, the receiving module 23 detects if the photo and the face corresponding to the phone number are found in the storage system 14. If the photo and the face are not found in the storage system 14, in block S52, the prompt module 22 displays the phone number on the display 11 and prompts that there is no photo corresponding to the phone number, and the procedure ends. If the photo and the face corresponding to the phone number are found, block S53 is implemented.

In block S53, the prompt module 22 displays the searched photo on the display 11 and highlights the face.

In block S54, the prompt module 22 detects if the call has been answered. If the call goes unanswered, block S55 is implemented. If the call has been answered, the procedure ends.

In block S55, the prompt module 22 displays the phone number and the photo having a highlighted face on the display 11.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
    a storage system for storing a plurality of photos and facial features of recognized faces in the plurality of photos, each of the recognized face corresponding to a phone number in a contact list of the communication device; and
    at least one processor to execute one or more programs stored in the storage system, the one or more programs comprising:
    a receiving module operable to display a photo selected from the storage system on a display of the communication device in response to a phone number dialing request;
    a face detection module operable to detect faces in the photo;
    the receiving module also operable to determine a selected face from the detected faces in response to receiving a selection signal;
    a face recognition module operable to recognize facial features of the selected face, and search the storage system for the selected face according to the recognized facial features of the selected face; and
    the receiving module further operable to determine a phone number corresponding to the selected face, and dial the determined phone number.

2. The communication device of claim 1, wherein the receiving module is further operable to determine a phone number of a received call, and search the storage system for a photo and a face corresponding to the phone number of the received call.

3. The communication device of claim 2, wherein the one or more programs further comprise a prompt module operable to display the searched photo on the display and highlight the face corresponding to the phone number of the received call if the photo and the face are found in the storage system, display the phone number of the received call and the photo having a highlighted face on the display if the phone number of the received call goes unanswered, and display the phone number of the received on the display and prompts that there is no photo and face corresponding to the phone number of the received call if the photo and the face are not found in the storage system.

4. The communication device of claim 3, wherein
    the face recognition module is further operable to detect if the detected faces exist in the storage system; and
    the prompt module is further operable to prompt the user to edit communication information of the detected faces if the detected faces do not exist in the storage system.

5. The communication device of claim 4, wherein the communication information comprises a contact name and a phone number corresponding to the detected faces that do not exist in the storage system.

6. The communication device of claim 4, wherein the receiving module is further operable to store the communication information into the storage system.

7. A communication method, the communication method comprising:
   displaying a photo selected from a storage system of a communication device on a display of the communication device in response to a phone number dialing request;
   detecting faces in the photo;
   determining a selected face from the detected faces in response to receiving a selection signal;
   recognizing facial features of the selected face, and searching a storage system of the communication device for the selected face according to the recognized facial features of the selected face; and
   determining a phone number corresponding to the selected face, and dialing the determined phone number.

8. The communication method of claim 7, further comprising:
   determining a phone number of a received call; and
   searching the storage system for a photo and a face corresponding to the phone number of the received call;
   displaying the searched photo on the display and highlighting the face corresponding to the phone number of the received call if the photo and the face are found in the storage system;
   displaying the phone number of the received call and the photo having the highlighted face on the display if the phone number of the received call goes unanswered; and
   displaying the phone number of the received call on the display and prompting that there is no photo and face corresponding to the phone number of the received call if the photo and the face are not found in the storage system.

9. The communication method of claim 7, further comprising:
   detecting if the detected faces exist in the storage system;
   prompting the user to edit communication information of the detected faces if the detected faces do not exist in the storage system; and
   storing the communication information into the storage system.

10. The communication method of claim 9, wherein the communication information comprises a contact name and a phone number corresponding to the detected faces that do not exist in the storage system.

11. A non-transitory medium having stored therein instructions that, when executed by a communication device, causes the communication device to perform a communication method comprising:
   displaying a photo selected from a storage system of a communication device on a display of the communication device in response to a phone number dialing request;
   detecting faces in the photo;
   determining a selected face from the detected faces in response to receiving a selection signal;
   recognizing facial features of the selected face, and searching a storage system of the communication device for the selected face according to the recognized facial features of the selected face; and
   determining a phone number corresponding to the selected face, and dialing the determined phone number.

12. The medium of claim 11, further comprising:
   determining a phone number of a received call; and
   searching the storage system for a photo and a face corresponding to the phone number of the received call;
   displaying the searched photo on the display and highlighting the face corresponding to the phone number of the received call if the photo and the face are found in the storage system;
   displaying the phone number of the received call and the photo having the highlighted face on the display if the phone number of the received call goes unanswered; and
   displaying the phone number of the received call on the display and prompting that there is no photo and face corresponding to the phone number of the received call if the photo and the face are not found in the storage system.

13. The medium of claim 11, further comprising:
   detecting if the detected faces exist in the storage system;
   prompting the user to edit communication information of the detected face if the detected faces do not exist in the storage system; and
   storing the communication information into the storage system.

14. The medium of claim 13, wherein the communication information comprises a contact name and a phone number corresponding to the detected faces that do not exist in the storage system.

15. A communication method, the communication method comprising:
   displaying a photo selected from a storage system of a communication device on a display of the communication device;
   detecting faces in the photo;
   prompting to edit communication information of each of the detected faces through the display;
   storing the communication information of each of the detected faces into the storage system to associate each of the detected faces with an instance of the communication information; and
   initiating a communication according to an instance of the communication information associated with a first face in the detected faces in the photo in response to an operation associated with first face in the photo.

* * * * *